United States Patent
Endo et al.

(10) Patent No.: US 7,486,332 B2
(45) Date of Patent: Feb. 3, 2009

(54) CAMERA HAVING LENS SYSTEM

(75) Inventors: Hiroshi Endo, Asaka (JP); Yoshihiro Ito, Asaka (JP); Takehiko Senba, Asaka (JP); Akio Omiya, Saitama (JP)

(73) Assignees: FUJIFILM Corporation, Tokyo (JP); Fujinon Corporation, Tokyo (JP)

( * ) Notice: Subject to any disclaimer, the term of this patent is extended or adjusted under 35 U.S.C. 154(b) by 681 days.

(21) Appl. No.: 10/849,138

(22) Filed: May 20, 2004

(65) Prior Publication Data

US 2004/0246364 A1 Dec. 9, 2004

(30) Foreign Application Priority Data

Jun. 4, 2003 (JP) ............... 2003-159869

(51) Int. Cl.
*H04N 5/225* (2006.01)

(52) U.S. Cl. ................. 348/360; 348/373; 348/208.11; 396/348

(58) Field of Classification Search ................ 348/360, 348/335, 340, 341, 344, 373–375, 345, 349, 348/362–363, 240.2; 359/704, 379, 814, 359/823, 824, 614; 396/72, 73, 75, 348–350, 396/343, 270, 340–341
See application file for complete search history.

(56) References Cited

U.S. PATENT DOCUMENTS

| | | | | |
|---|---|---|---|---|
| 4,482,228 A | * | 11/1984 | Fujita | ........................... 396/73 |
| 4,725,864 A | * | 2/1988 | Ogawa et al. | .................. 396/73 |
| 4,739,411 A | * | 4/1988 | Bolton | ........................ 348/346 |
| 4,887,107 A | * | 12/1989 | Nakamura et al. | ............. 396/75 |
| 4,937,609 A | * | 6/1990 | Wakabayashi et al. | ......... 396/73 |
| 5,721,995 A | * | 2/1998 | Katsura et al. | ............... 396/351 |
| 5,765,049 A | * | 6/1998 | Hase et al. | ..................... 396/73 |
| 6,452,732 B1 | * | 9/2002 | Okada et al. | ................. 359/813 |
| 6,779,933 B2 | * | 8/2004 | Sato et al. | ..................... 396/463 |
| 6,835,006 B2 | * | 12/2004 | Tanaka et al. | ................ 396/349 |
| 6,944,396 B2 | * | 9/2005 | Ito et al. | ........................ 396/75 |
| 6,992,720 B2 | * | 1/2006 | Kaneda | ...................... 348/363 |
| 7,019,914 B2 | * | 3/2006 | Omiya et al. | ................ 359/695 |
| 7,038,865 B2 | * | 5/2006 | Ito et al. | ...................... 359/819 |
| 2003/0156832 A1 | * | 8/2003 | Nomura et al. | ............... 396/72 |

FOREIGN PATENT DOCUMENTS

| | | |
|---|---|---|
| JP | 5-34769 A | 2/1993 |
| JP | 7-152075 A | 6/1995 |
| JP | 2001-100296 A | 4/2001 |

* cited by examiner

*Primary Examiner*—David L Ometz
*Assistant Examiner*—Usman Khan
(74) *Attorney, Agent, or Firm*—Sughrue Mion, PLLC

(57) ABSTRACT

A camera has a lens system that includes a lens barrel incorporating therein an image taking lens, the lens barrel being variable in a barrel length between a collapsed state in which the barrel length is relative short and a photographic state in which the barrel length is relative long. The lens barrel comprises a light quantity control member that controls quantity of photographic light passing through the image taking lens, and a light quantity control member saving and advancing mechanism that provides such a control that when the lens barrel changes over from the photographic state to the collapsed state, the light quantity control member is saved from a photographic optical axis, and when the lens barrel changes over from the collapsed state to the photographic state, the light quantity control member is advanced to the photographic optical axis.

6 Claims, 17 Drawing Sheets

CAMERA HAVING LENS SYSTEM

BACKGROUND OF THE INVENTION

1. Field of the Invention

The present invention relates to a camera in which subject light is formed on a solid state imaging device so that an image signal is created.

2. Description of the Related Art

Hitherto, such a type of camera that photography is performed on a silver halide film comes into wide use. And recently, in addition to such a type of camera, there rapidly comes into wide use a digital camera in which a subject is image-formed on a solid state imaging device such as a CCD imaging device or a CMOS imaging device to create an image signal.

Also in such a digital camera, there is strongly needed an improvement of a portability as well as an improvement of a photographic efficiency. There is known such a type of digital camera that in order that a desired view angle of photography is available through varying a focal length and the camera is convenient to carry about, at the time of non-photography a lens barrel, which incorporates thereinto an image taking lens constituted of a plurality of lens groups, is collapsed into a cover member of the camera so that the respective lengths among the plurality of lens groups constituting the image taking lens are under lengths of the minimum requirements for photography, and at the time of photography the lens barrel is extended from the cover member of the camera so that the respective lengths among the plurality of lens groups are lengths necessary for photography (cf. Japanese Patent Application Laid Open Gazette TokuKai Hei. 5-34769).

Hitherto, in a digital camera having the above-mentioned lens barrel, it is attempted to provide thinness of the lens structure by collapsing an image taking lens so as to narrow intervals between ones arranged on an optical axis, for example, lens groups, light quantity control members such as a shutter and an aperture, and a solid state imaging device, as far as possible.

However, there is a limit as to providing thinness through narrowing intervals between ones arranged on an optical axis as far as possible.

SUMMARY OF THE INVENTION

In view of the foregoing, it is an object of the present invention to provide a camera having a lens system contributing to providing thinness.

To achieve the above-mentioned objects, the present invention provides a camera in which subject light is formed on a solid state imaging device so that an image signal is generated, the camera having a lens system comprising:

a lens barrel incorporating therein an image taking lens, the lens barrel being variable in a barrel length between a collapsed state in which the barrel length is relatively short and a photographic state in which the barrel length is relatively long, wherein the lens barrel comprises:

a light quantity control member that controls quantity of photographic light passing through the image taking lens; and a light quantity control member saving and advancing mechanism that provides such a control that when the lens barrel changes over from the photographic state to the collapsed state, the light quantity control member is saved from a photographic optical axis, and when the lens barrel changes over from the collapsed state to the photographic state, the saved light quantity control member is advanced to the photographic optical axis.

According to the camera of the present invention as mentioned above, when the lens barrel changes over from the photographic state to the collapsed state, the light quantity control member is saved from a photographic optical axis. This feature makes it possible to implement further thinness of the camera as compared with the conventional one in which the lens elements and the light quantity control member on the photographic optical axis are disposed as closer as possible.

In the camera according to the present invention as mentioned above, it is preferable that the image taking lens consists of a plurality of lens elements, and that the camera further comprises a lens saving and advancing mechanism that provides such a control that when the lens barrel changes over from the photographic state to the collapsed state, any one of the plurality of lens elements is saved from the photographic optical axis independently of the light quantity control member, and when the lens barrel changes over from the collapsed state to the photographic state, any one of the plurality of lens elements is advanced to the photographic optical axis.

This feature makes it possible to implement further thinness of the camera.

DETAILED DESCRIPTION OF PREFERRED EMBODIMENTS

Embodiments of the present invention will be described with reference to the accompanying drawings.

Figure 1:
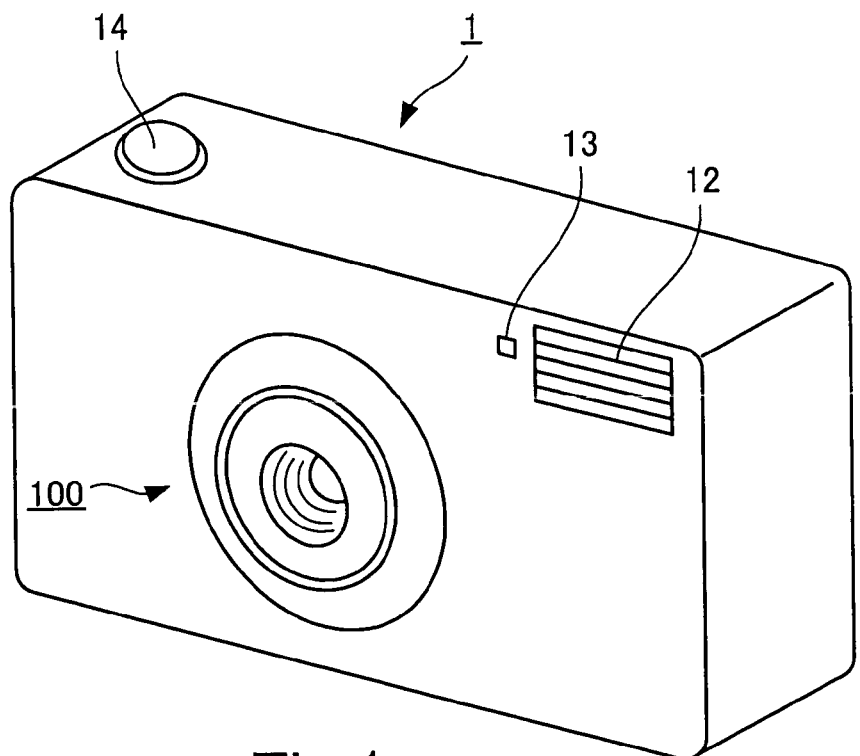
FIG. 1 is a perspective view of a digital camera of a first embodiment of the present invention.
Figure 2:
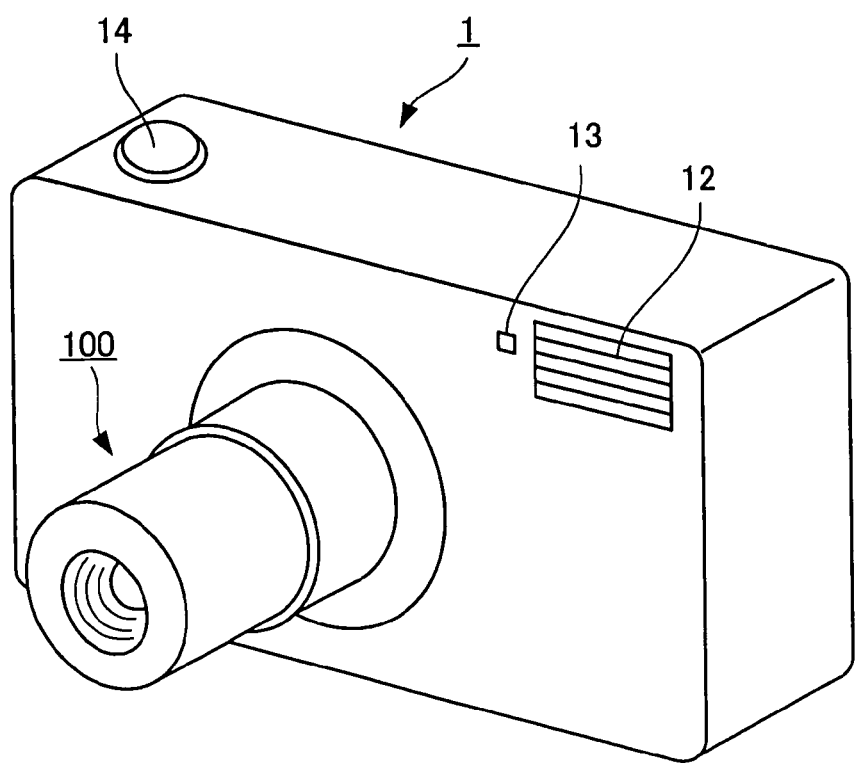
FIG. 2 is a perspective view of the digital camera of the first embodiment of the present invention.

Each of FIG. 1 and FIG. 2 is a perspective view of the digital camera of the first embodiment of the present invention.

FIG. 1 shows a collapsed state of a lens barrel 100 incorporating therein a zoom lens of a digital camera 1 of the present embodiment. FIG. 2 shows an extended state of the lens barrel 100 of the digital camera 1.

The lens barrel 100 of the digital camera 1 shown in FIG. 1 and FIG. 2 incorporates therein an image taking lens consisting of two lens groups of a front elements lens and a rear elements lens as will be explained later. According to the digital camera 1, a movement of those lens groups in an optical axis direction makes it possible to perform an adjustment of a focal length. And movements of those lens groups in the optical axis direction maintaining lengths among the lens groups wherein an adjustment of a focal length is carried out make it possible to perform an adjustment of a focusing.

In upper front of the digital camera 1 shown in FIG. 1 and FIG. 2, there are disposed an auxiliary light flash window 12 and a finder objective window 13. On the top of the digital camera 1, there is disposed a shutter button 14.

On the back (not illustrated) of the digital camera 1, there is disposed a zoom operation switch. When one end of the zoom operation switch is depressed, the lens barrel 100 is extended to a telephoto side while the zoom operation switch is depressed. And when another end of the zoom operation switch is depressed, the lens barrel 100 is moved to a wide-angle side while the zoom operation switch is depressed.

Figure 3:
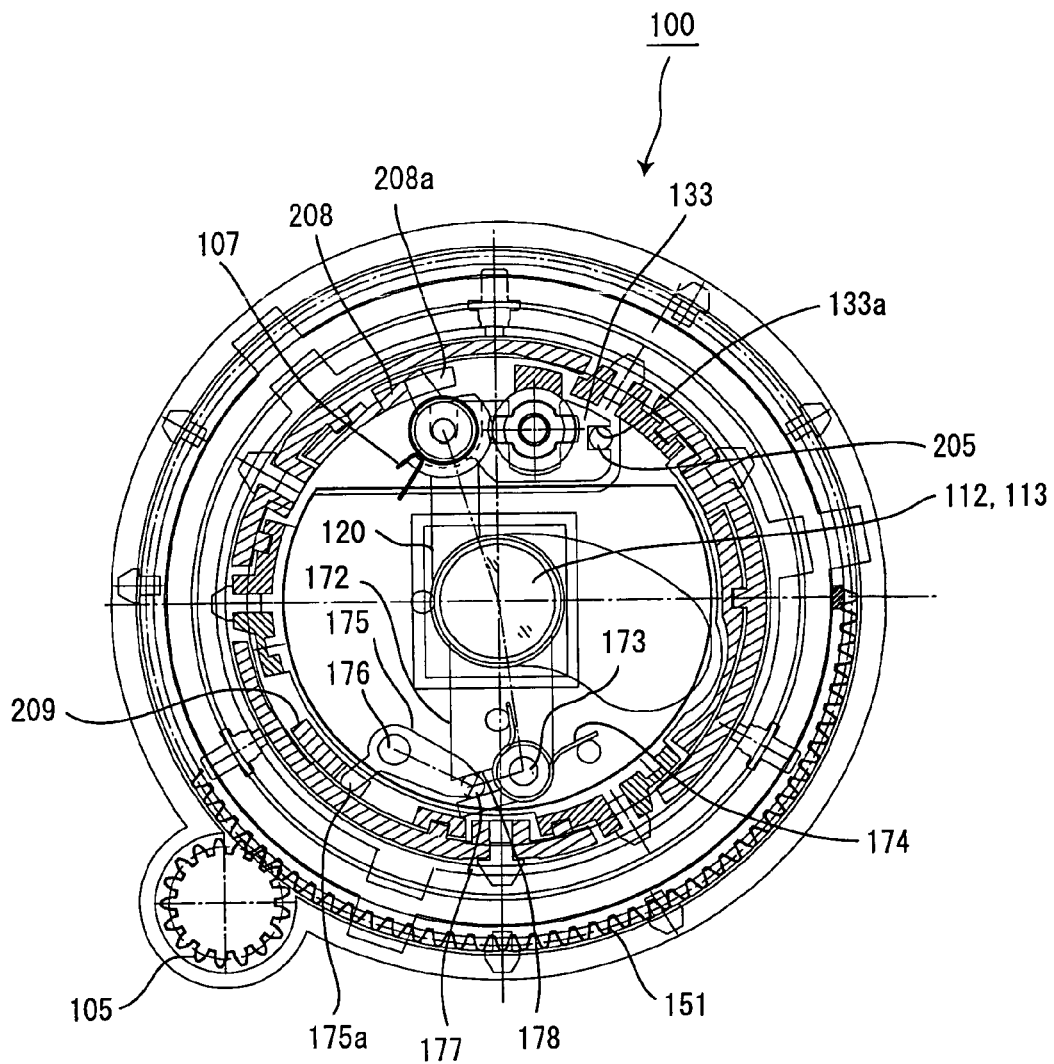
FIG. 3 is a typical illustration showing main parts of the digital camera of the first embodiment of the present invention, looking from an optical axis direction a lens barrel in a state of an extension.
Figure 4:
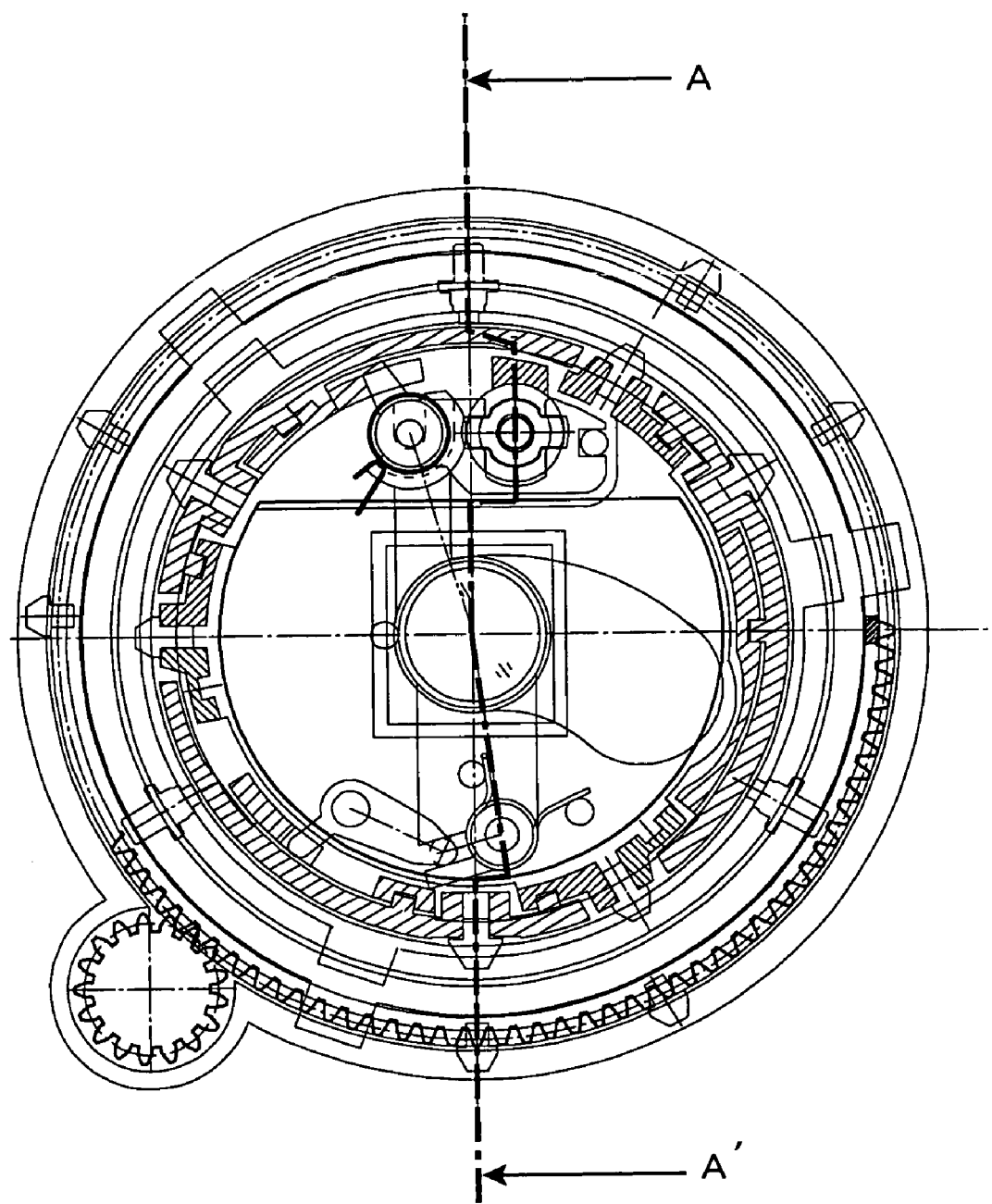
FIG. 4 is a view showing the line A-A' on the same sectional view as FIG. 3.
Figure 5:
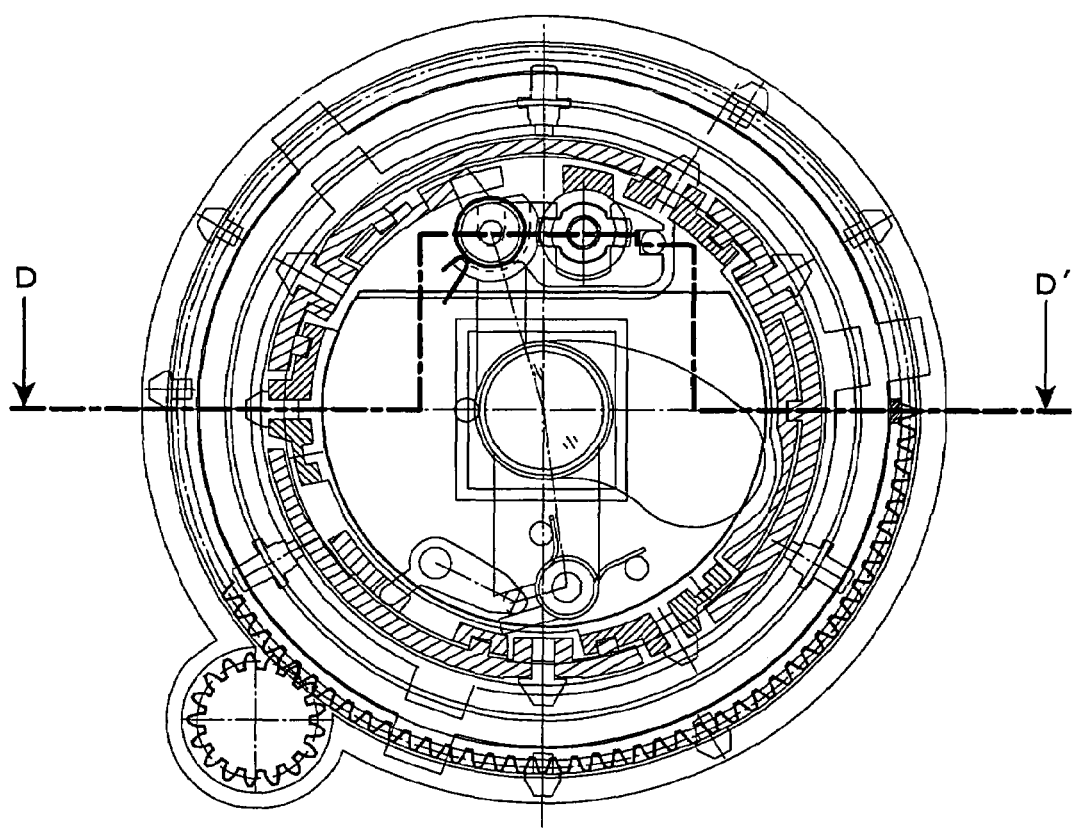
FIG. 5 is a view showing the line D-D' on the same sectional view as FIG. 3.
Figure 6:
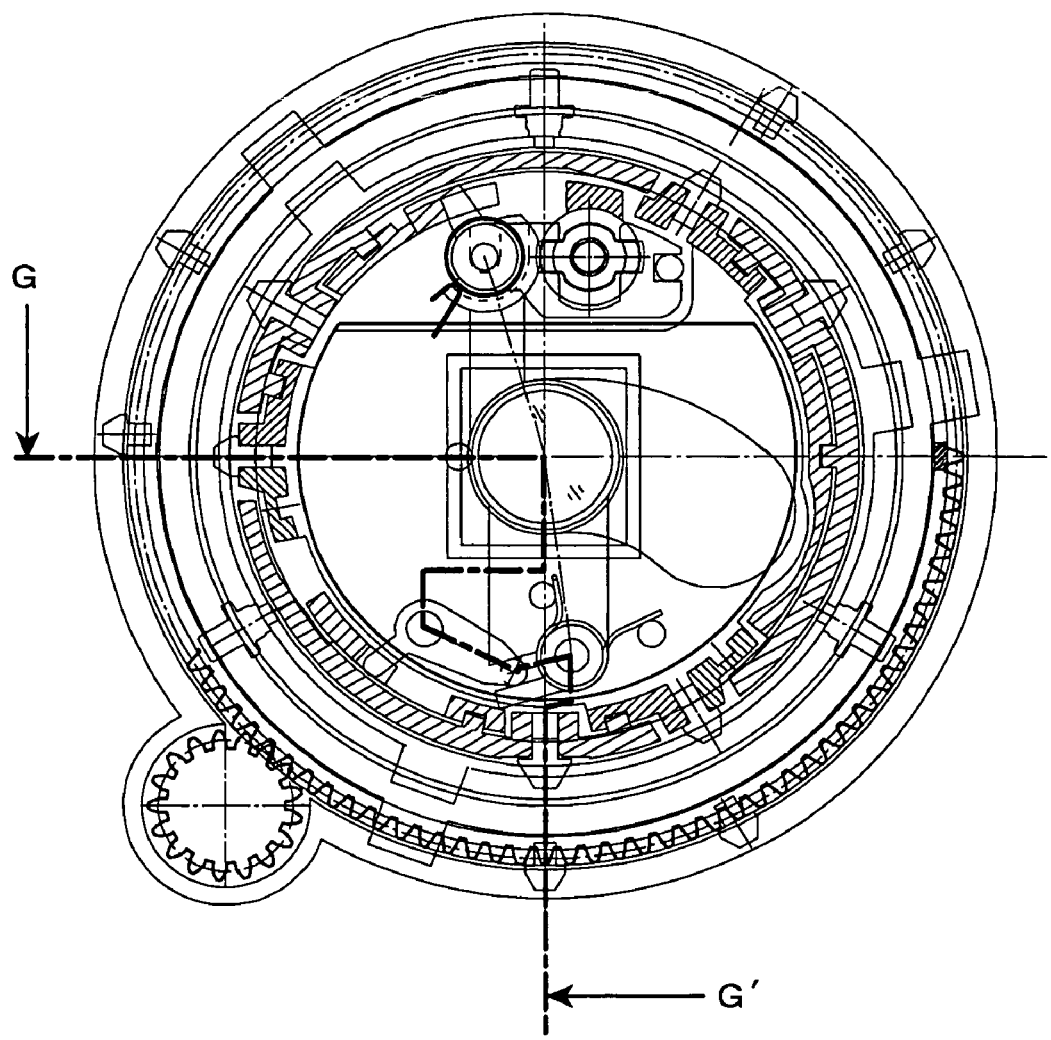
FIG. 6 is a view showing the line G-G' on the same sectional view as FIG. 3.
Figure 7:
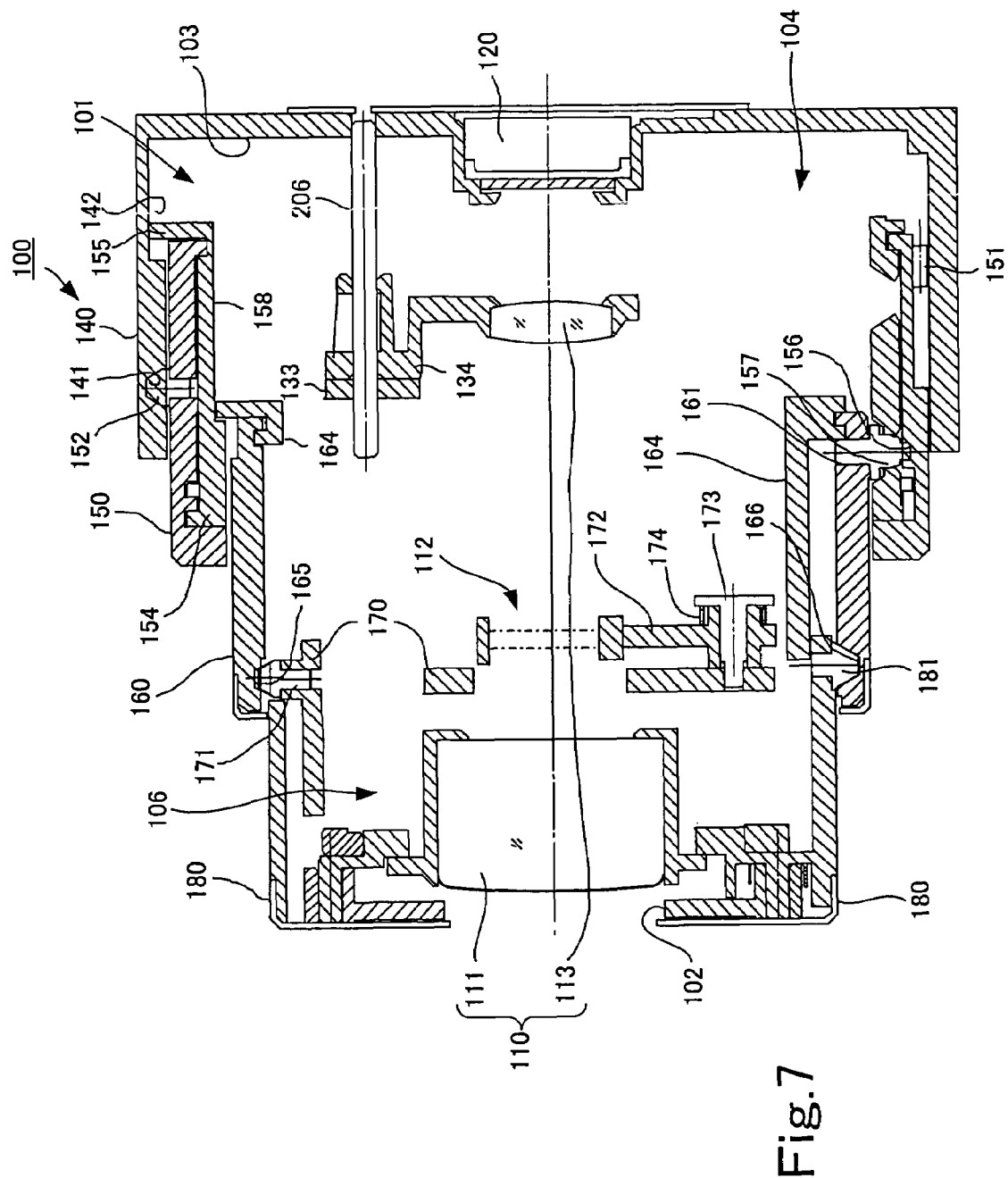
FIG. 7 is a sectional view showing a state of a tele-edge where the focal length is longest, taken along the line A-A' in FIG. 4.
Figure 8:
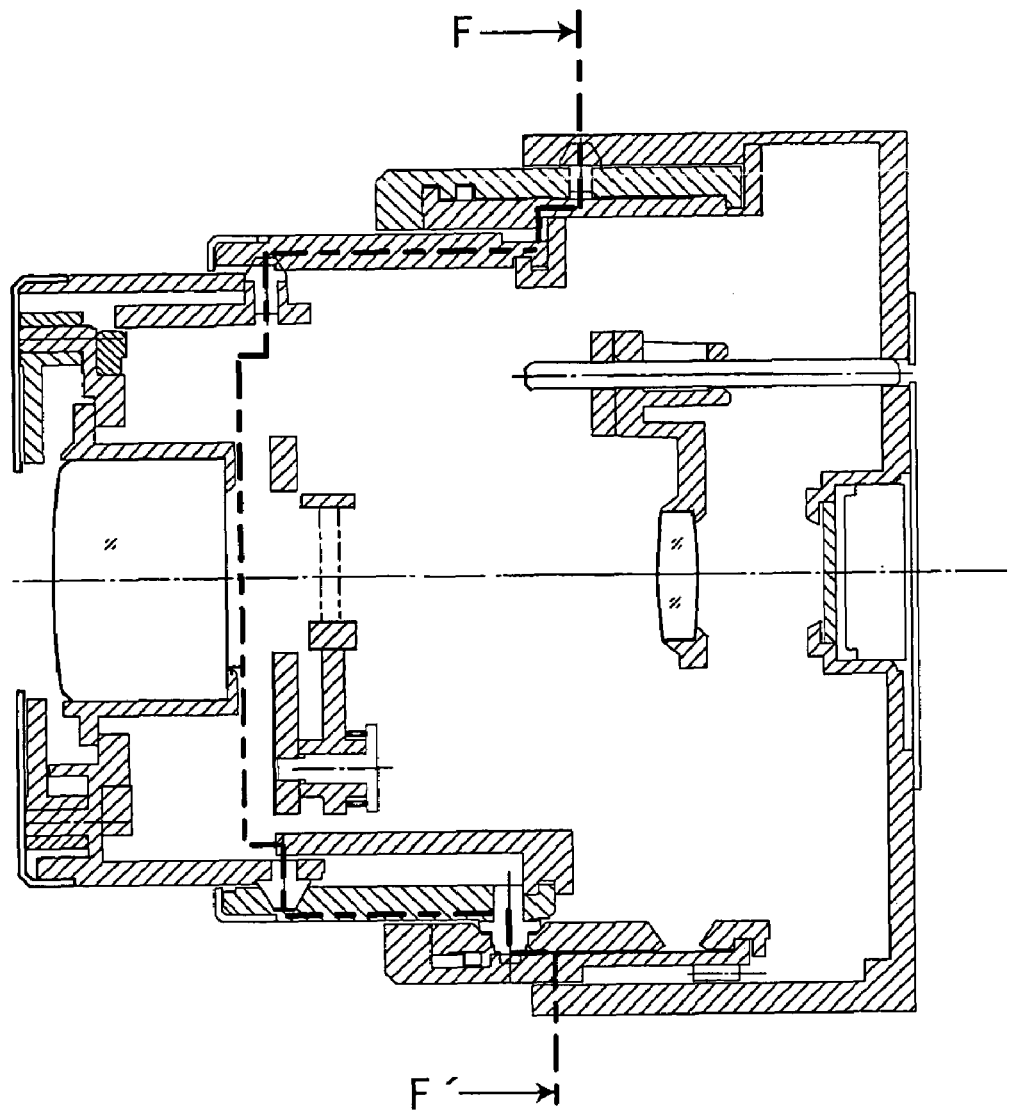
FIG. 8 is a view showing the line F-F' on the same sectional view as FIG. 7.
Figure 9:
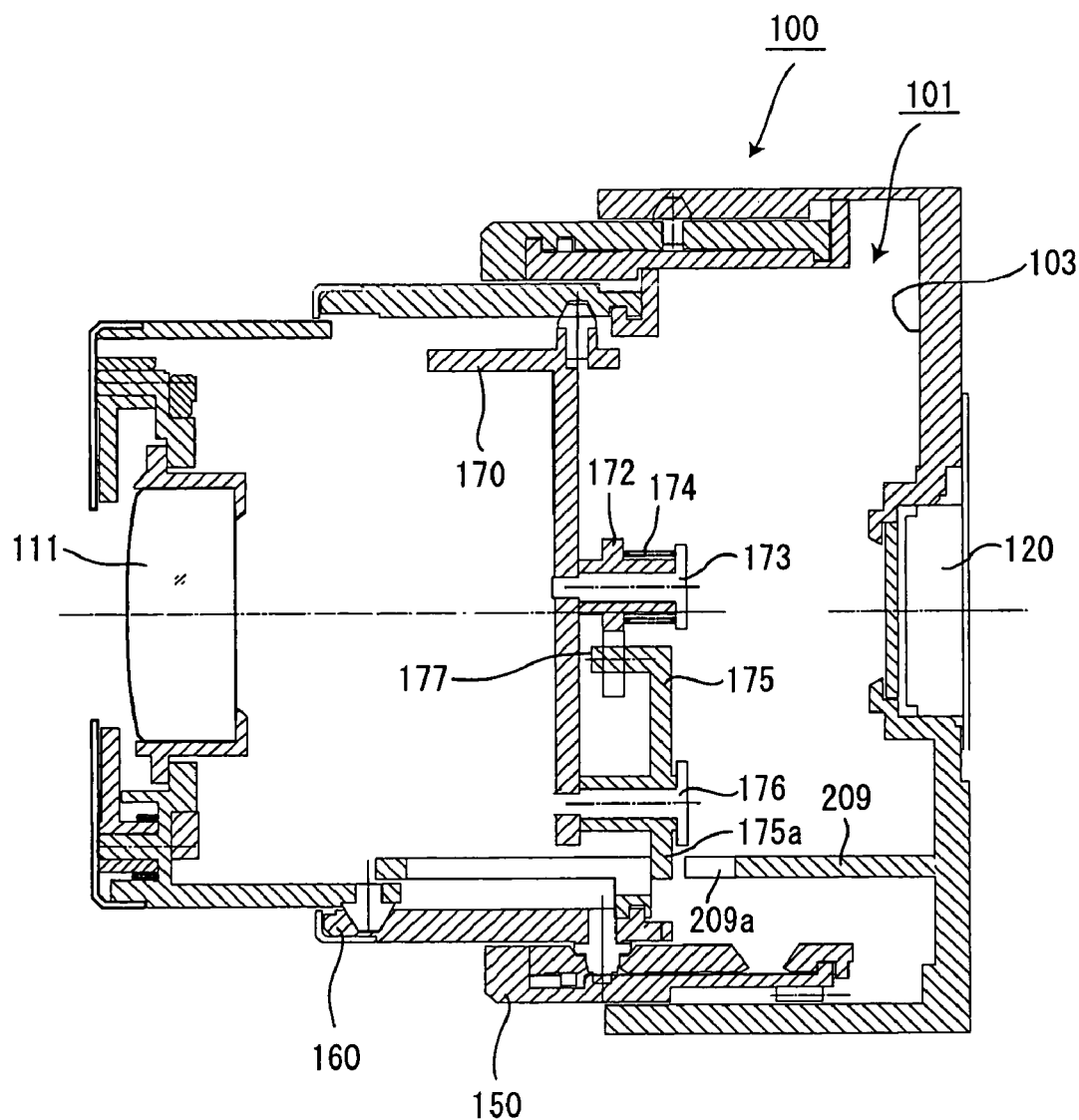
FIG. 9 is a sectional view taken along the line G-G' in FIG. 6.
Figure 10:
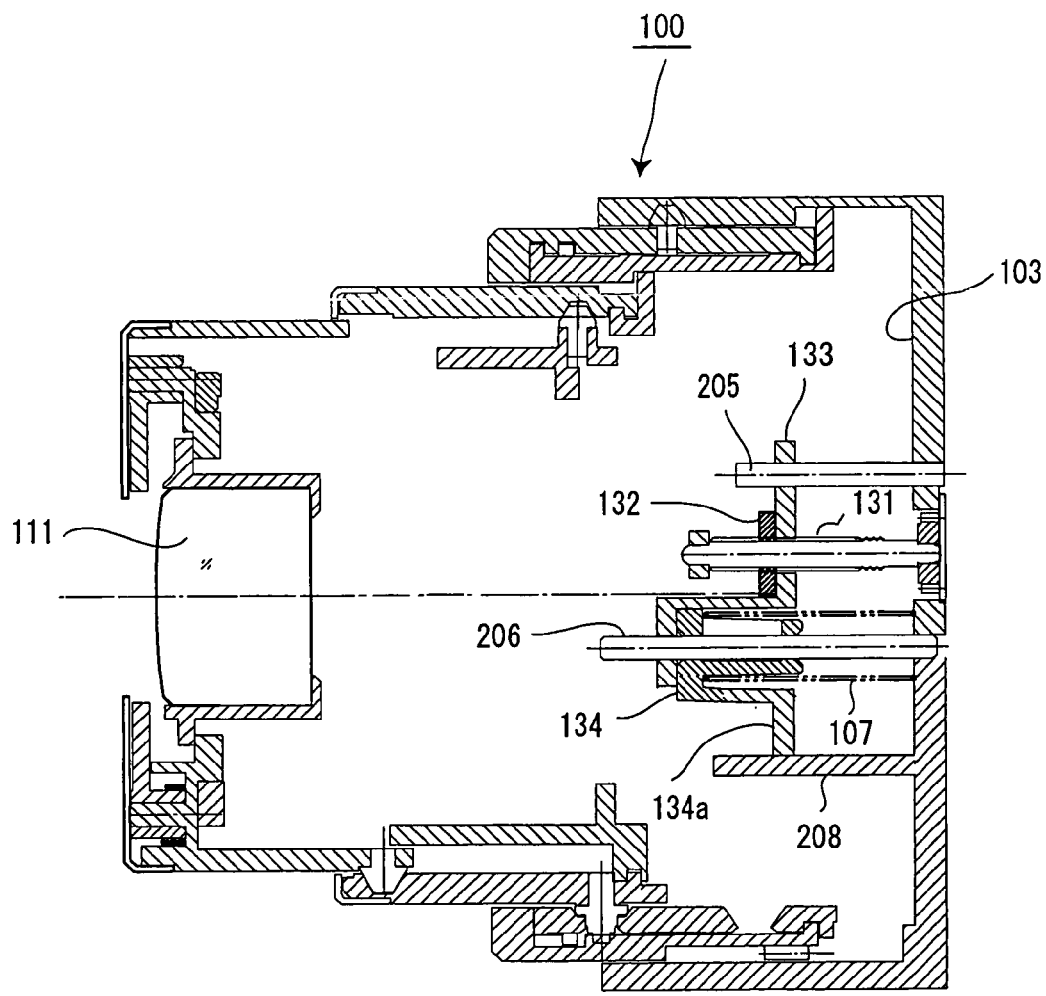
FIG. 10 is a sectional view taken along the line D-D' in FIG. 5.
Figure 11:
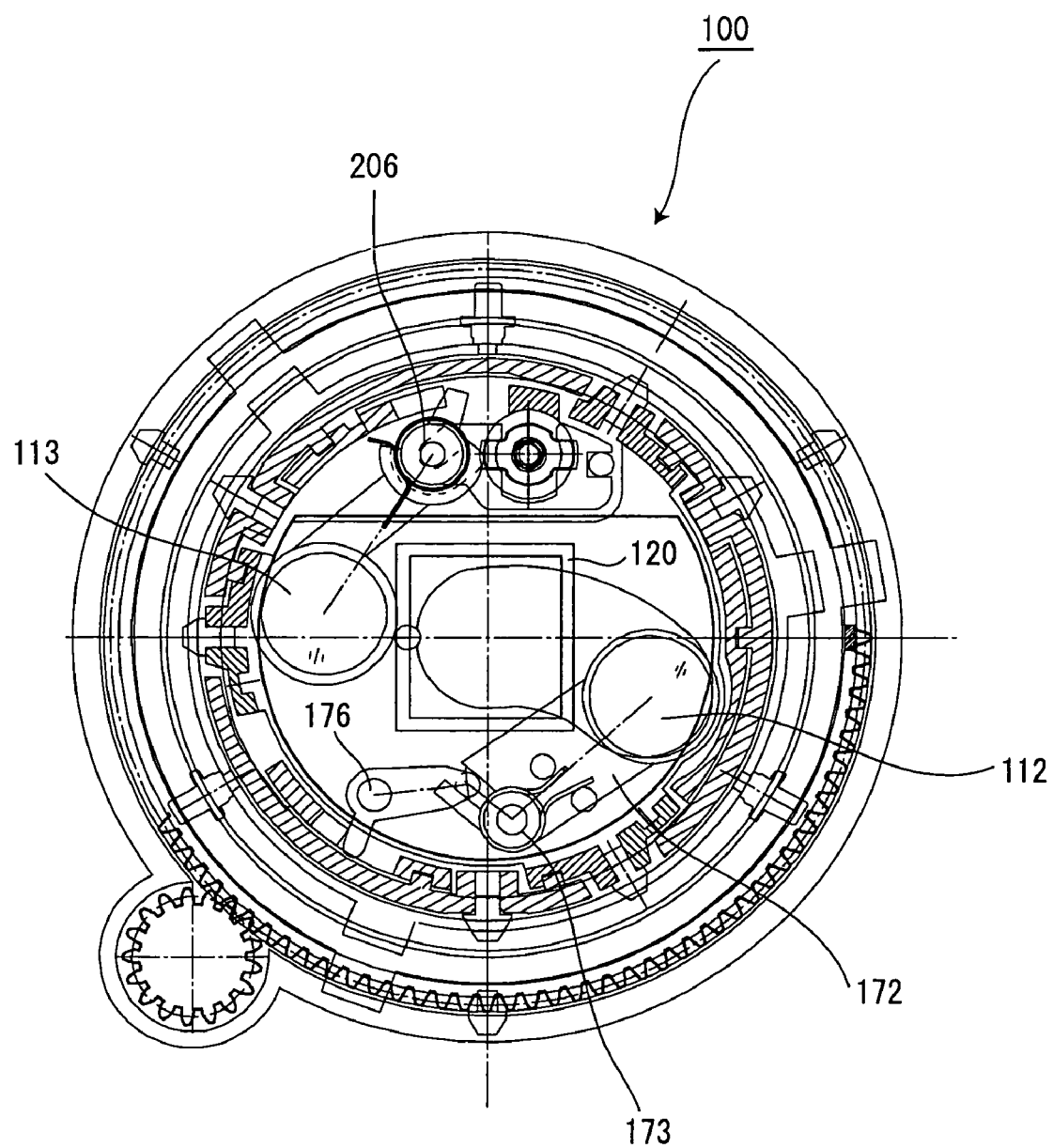
FIG. 11 is a typical illustration showing main parts of the digital camera of the first embodiment of the present invention as shown FIG. 1 to FIG. 10, looking from an optical axis direction a lens barrel in a state of a collapse.
Figure 12:
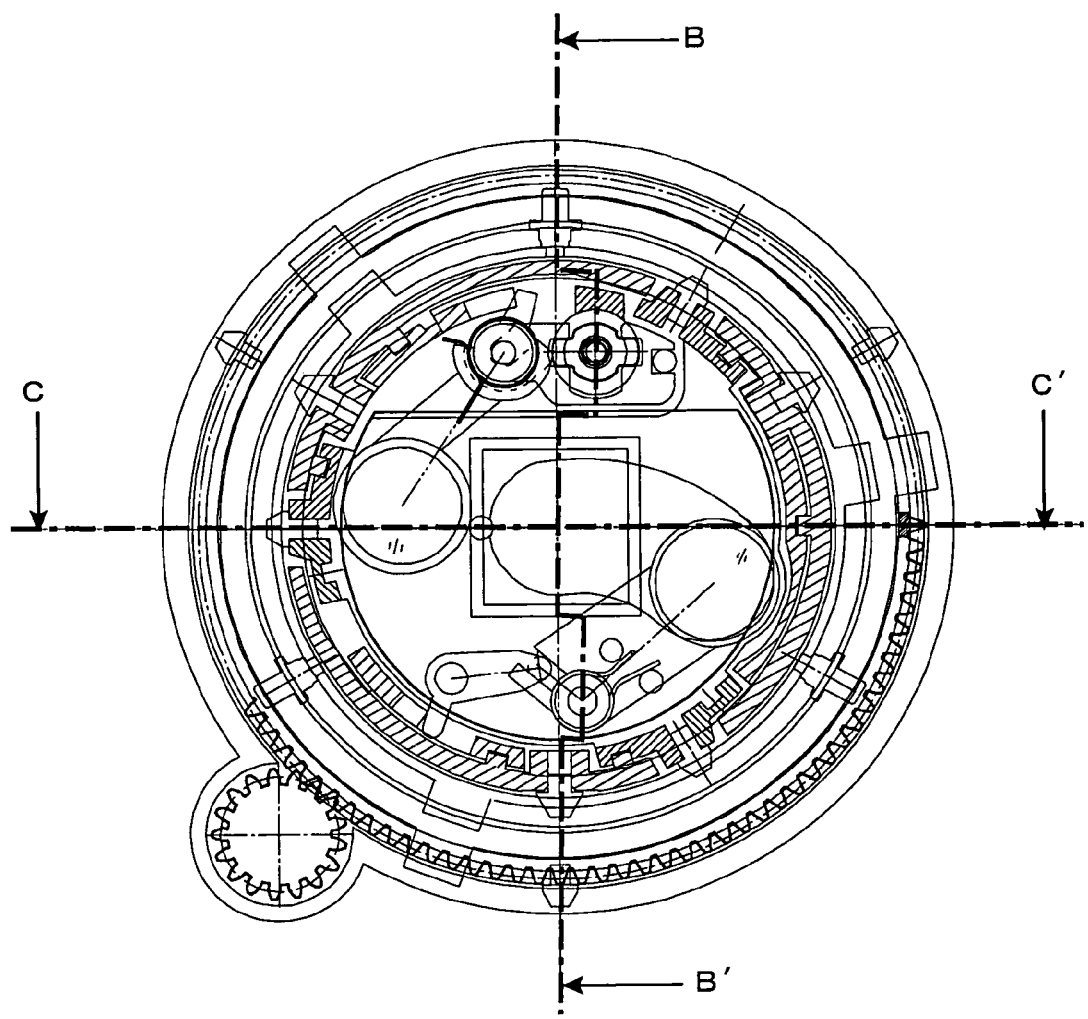
FIG. 12 is a view showing the line B-B' and the line C-C' on the same sectional view as FIG. 11.
Figure 13:
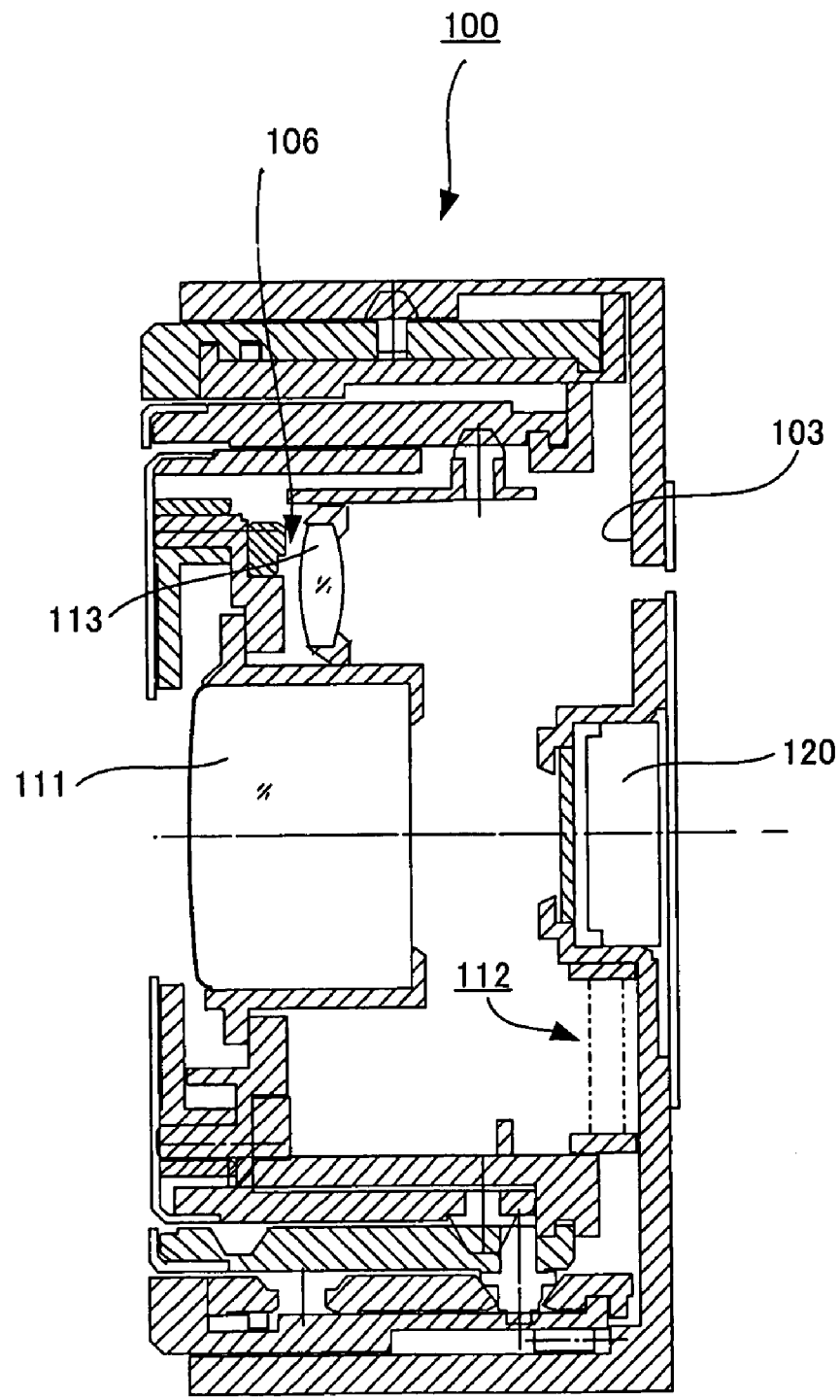
FIG. 13 is a sectional view taken along the line C-C' of FIG. 12.
Figure 14:
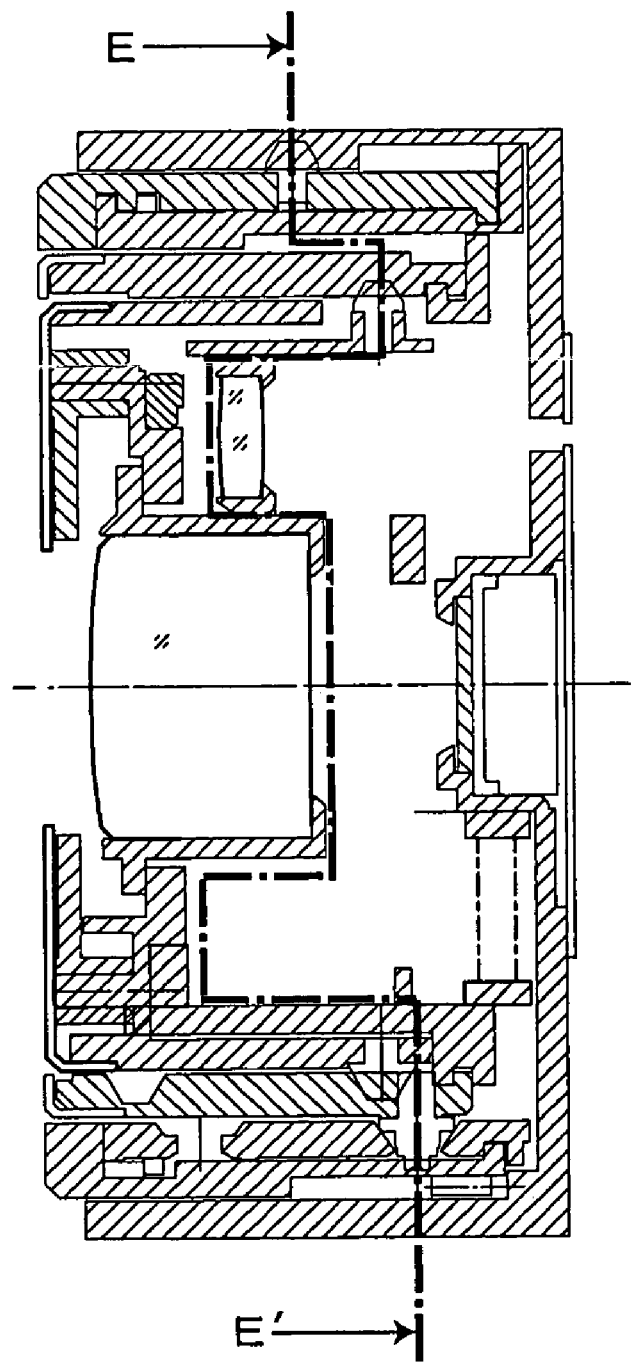
FIG. 14 is a view showing the line E-E' on the same sectional view as FIG. 13.
Figure 15:
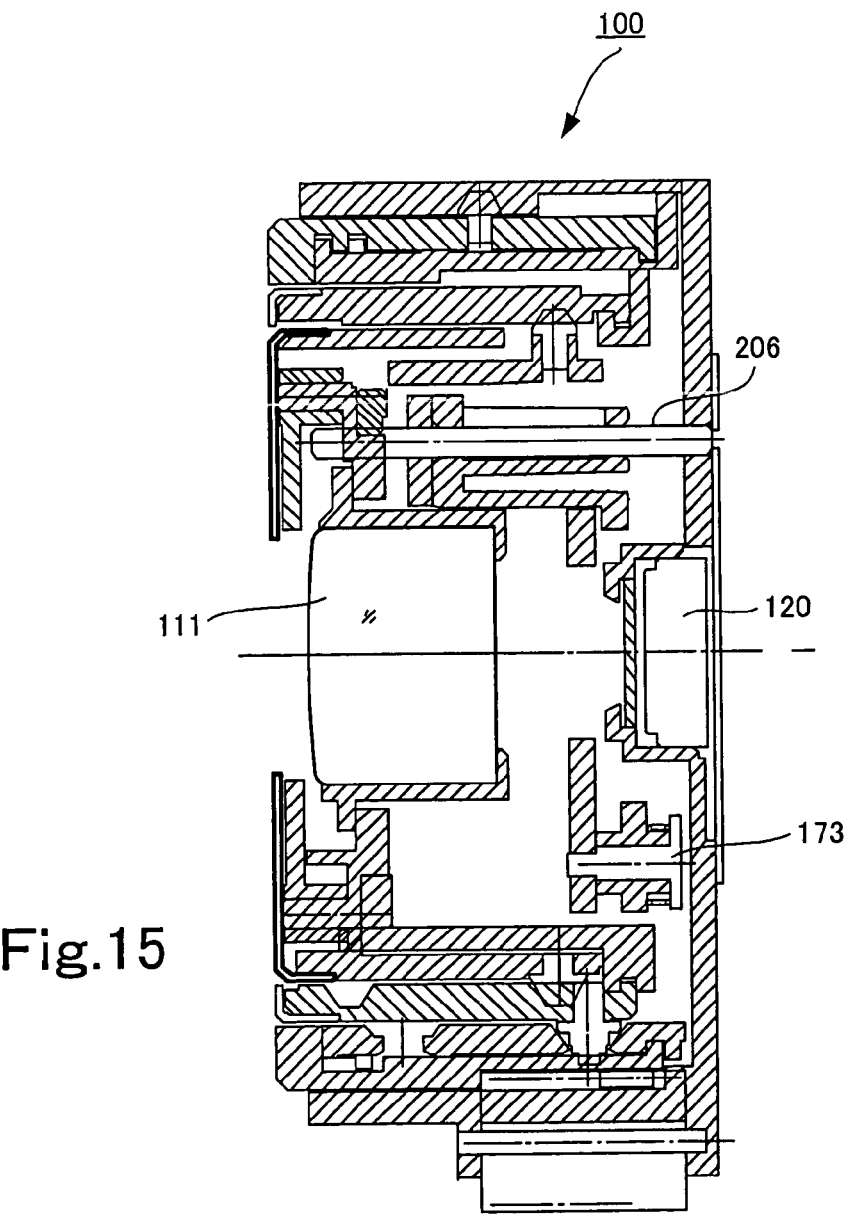
FIG. 15 is a sectional view taken along the line B-B' of FIG. 12.

FIG. 3 is a typical illustration showing main parts of the digital camera of the first embodiment of the present invention, looking from an optical axis direction a lens barrel in a state of an extension. FIG. 4 is a view showing the line A-A' on the same sectional view as FIG. 3. FIG. 5 is a view showing the line D-D' on the same sectional view as FIG. 3. FIG. 6 is a view showing the line G-G' on the same sectional view as FIG. 3. FIG. 7 is a sectional view showing a state of a tele-edge where the focal length is longest, taken along the line A-A' in FIG. 4. FIG. 8 is a view showing the line F-F' on the same sectional view as FIG. 7. FIG. 9 is a sectional view taken along the line G-G' in FIG. 6. FIG. 10 is a sectional view taken along the line D-D' in FIG. 5. FIG. 11 is a typical illustration showing main parts of the digital camera of the first embodiment of the present invention as shown FIG. 1 to FIG. 10, looking from an optical axis direction a lens barrel in a state of a collapse. FIG. 12 is a view showing the line B-B' and the line C-C' on the same sectional view as FIG. 11. FIG. 13 is a sectional view taken along the line C-C' of FIG. 12. FIG. 14 is a view showing the line E-E' on the same sectional view as FIG. 13. FIG. 15 is a sectional view taken along the line B-B' of FIG. 12.

Hereinafter, the explanation will be continued mainly referring to FIG. 7 and in addition other figures as the demand arises.

An internal space 101 of a lens barrel 100 shown in FIG. 3 to FIG. 15 stores therein a image taking lens 110 comprising two groups of a front elements lens 111 and a rear elements lens 113 in the named order with respect to the optical axis direction. The image taking lens 110 is so arranged that a relative movement of the front elements lens 111 and the rear elements lens 113 in the optical axis direction makes it possible to vary the focal length, and a movement of the image taking lens 110 in the optical axis direction maintaining a length between the front elements lens 111 and the rear elements lens 113 when a predetermined focal length is established makes it possible to perform a focusing.

At the front of the internal space, there is formed an aperture 102 through which the image taking lens 110 appears. At the rear of the internal space, there is disposed a wall member 103, which is fixed on a camera body, or which constitutes a part of the camera body. The internal space 101 is defined in its outline by the wall member 103 and a plurality of cylindrical members that will be described later.

The front elements lens 111 is held inside a front elements frame 180, which is smallest in an external diameter, of the plurality of cylindrical members, and which is located most in front on the optical axis at the time of the extension of the lens barrel. When an external diameter of the front elements lens 111 is smaller than an internal diameter of the front elements frame 180, there is formed beside the front elements lens 111 a space between the front elements lens 111 and the front elements frame 180. Hereinafter, the space between the front elements lens 111 and the front elements frame 180 is referred to as a front elements lens side 106.

A CCD solid state imaging device (hereinafter, it will be simply referred to as CCD) 120 is mounted on the wall member 103 in a state that the CCD 120 projects onto the internal space 101. The disposition of the CCD 120 at the position projecting onto the internal space 101 may form a hollow portion 104 divided by the CCD 120 and the wall member 103 by the side of the CCD 120.

A feed screw 131 (cf. FIG. 10) is rotatably supported on the wall member 103. A nut member 132 (cf. FIG. 10) is engaged with the feed screw 131. A rear elements lens guide frame 133 for guiding the rear elements lens 113 in the optical axis direction is fixed on the nut member 132. The rear elements lens guide frame 133 is fixed on the nut member 132, and a guide rod 205 projecting from the wall member 103 is engaged with a fork-shaped groove 133a (cf. FIG. 3) provided on the rear elements lens guide frame 133. Thus, the rear elements lens guide frame 133 moves in the optical axis direction by the rotation of the feed screw 131.

A rear elements lens holding frame 134 for holding the rear elements lens 113 is fixed on the rear elements lens guide frame 133.

The feed screw 131, which is engaged on a spiral basis with the nut member 132 on which the rear elements lens guide frame 133 is fixed, is driven by a focus motor (not illustrated) provided at the camera body side. Rotation of the feed screw 131 causes the rear elements lens guide frame 133 fixed on the nut member 132 and the rear elements lens holding frame 134 fixed on the rear elements lens guide frame 133 to move in the optical axis direction. Thus, the rear elements lens 113 held by the rear elements lens holding frame 134 moves in the optical axis direction.

A fixed cylinder 140 is fixed on the wall member 103. Inside the fixed cylinder 140 there is provided a rotary cylinder 150. The rotary cylinder 150 is provided with gear wheels 151, which mesh with pole-shaped gears 105 (cf. FIG. 3), around. A barrel driving motor (not illustrated) drives the pole-shaped gears 105 so that the rotary cylinder 150 rotates.

On the inside wall of the fixed cylinder 140 there is formed a cam groove 141 with which a cam pin 152, which is fixed on the c, is engaged. Accordingly, when the rotary cylinder 150 receives a rotary driving force via the pole-shaped gears 105, the rotary cylinder 150 goes ahead or goes back in an optical axis while rotating.

Inside the rotary cylinder 150 there is provided a rotary cylinder side progressive key-ring 154 in such a way that the rotary cylinder side progressive key-ring 154 is rotatably with respect to the rotary cylinder 150, but inhibited from the relative movement to the rotary cylinder 150 in the optical axis direction. A key plate 155 is fixed on the rotary cylinder side progressive key-ring 154. The key plate 155 is engaged with a key groove 142 extending in the optical axis direction, which is formed on the inner wall of the fixed cylinder 140, whereby the rotary cylinder side progressive key-ring 154 is inhibited from being rotated on the fixed cylinder 140 while it is permitted to move in the optical axis direction. Accordingly, when the rotary cylinder 150 moves in the optical axis direction while rotating, the rotary cylinder side progressive key-ring 154 does not rotate since it is inhibited from being rotated on the fixed cylinder 140, but moves in the optical axis direction together with the rotary cylinder 150.

Further, inside the rotary cylinder 150 there is provided an intermediate cylinder 160 that is rotatable. At the inner wall of the rotary cylinder 150, there is formed a cam groove 156. Further, also at the rotary cylinder side progressive key-ring 154 there is formed a cam groove 157 penetrating through its outer periphery and inner periphery. The cam groove 156 of the rotary cylinder 150 is engaged with a cam pin 161 provided on the intermediate cylinder 160 in such a manner that the cam pin 161 penetrates through the cam groove 157 of the rotary cylinder side progressive key-ring 154. Thus, when the rotary cylinder 150 moves in the optical axis direction while rotating, the intermediate cylinder 160 also moves in the optical axis direction relatively to the rotary cylinder 150 while rotating in accordance with a geometry of the cam grooves of the rotary cylinder 150 and the rotary cylinder side progressive key-ring 154.

Inside the intermediate cylinder 160 there is disposed an intermediate cylinder side progressive key-ring 164. At the rotary cylinder side progressive key-ring 154 there is formed a progressive key 158. The intermediate cylinder side progressive key-ring 164 is engaged with the progressive key 158 of the rotary cylinder side progressive key-ring 154. The intermediate cylinder side progressive key-ring 164 is rotatable relatively with respect to the intermediate cylinder 160, but is inhibited in a relative movement in the optical axis direction with respect to the intermediate cylinder 160. Accordingly, when the intermediate cylinder 160 moves in the optical axis direction relatively with respect to the rotary cylinder 150 while rotating, the intermediate cylinder side progressive key-ring 164 progressively moves in the optical axis direction with the movement of the intermediate cylinder 160 in the optical axis direction, without rotation.

At the inner wall of the intermediate cylinder 160, there is formed a cam groove 165 for guiding a shutter unit guide frame 170. The cam groove 165 is engaged with a cam pin 171 fixed on the shutter unit guide frame 170 in a state that the cam pin 171 is inhibited from being rotated with respect to the intermediate cylinder side progressive key-ring 164. Accordingly, when the intermediate cylinder 160 rotates, the shutter unit guide frame 170 progressively moves in the optical axis direction in accordance with the geometry of the cam groove 165 of the inner wall of the intermediate cylinder 160.

A shutter unit holding frame 172 for holding the shutter unit 112 is pivotally supported by the rotary shaft 173 so as to be rotatably movable with respect to the shutter unit guide frame 170. At the time of the collapse, the shutter unit holding frame 172 is saved to the hollow portion 104 by the side of the CCD 120 together with the shutter unit 112, as shown in FIG. 13, and at the time of the extension, the shutter unit holding frame 172 advances, as shown in FIG. 7, on the optical axis together with the shutter unit 112. The shutter unit 112 is provided with an aperture member for controlling a light quantity of the subject light passing through the image taking lens 110, and a shutter member for controlling a light quantity of the subject light passing through the image taking lens 110 by controlling a shutter speed. Those members adopt a system in which PLZT elements are used to control a light quantity. A rotatably movable range of the shutter unit holding frame 172 is a range that the shutter unit 112 held by the shutter unit holding frame 172 rotates between a using position (cf. FIG. 7) in which the shutter unit 112 advances on the optical axis of the image taking lens 110 and a saving position (cf. FIG. 13) in which the shutter unit 112 comes in the hollow portion 104 beside the CCD 120. There is provided a coil spring 174 around the rotary shaft 173. The shutter unit holding frame 172 is enabled by the coil spring 174 (cf. FIG. 3) in a direction in which the shutter unit 112 is rotated on the optical axis of the image taking lens 110, and is also enabled in the optical axis direction.

There will be explained later a mechanism in which when the shutter unit holding frame 172 rotatably moves, the shutter unit 112 rotates so as to be saved to the saving position set to the hollow portion 104.

At the intermediate cylinder 160, there is formed an additional cam groove 166 for guiding a front elements frame 180 holding the front elements lens 111. A cam pin 181, which is provided on the front elements frame 180, comes in the cam groove 166. The front elements frame 180 is inhibited from being rotated on the intermediate cylinder side progressive key-ring 164 but is permitted in a movement in the optical axis direction. Accordingly, when the intermediate cylinder 160 rotates, the front elements frame 180 progressively moves in the optical axis direction with respect to the intermediate cylinder 160 in accordance with the geometry of the cam groove 166.

With this mechanism, when the shutter unit 112 is in the state of the tele-edge, a transmission of the rotary driving force in the collapse direction via the pole-shaped gears 105 to the rotary cylinder 150 may collapse the image taking lens from the state of the tele-edge via the state of the wide-edge to the collapsed state shown in FIG. 13. Reversely, when the image taking lens is in the state of the collapsed state shown in FIG. 13, a transmission of the rotary driving force in the extension direction to the rotary cylinder 150 may extend the image taking lens from the collapsed state shown in FIG. 13 to the state of the wide-edge, and offers the state of the tele-edge via the state of the wide-edge.

When a photograph is taken, the above-mentioned zoom operation switch is operated to control a focal length between the tele-edge and the wide-edge, so that a desired photographic angle of view is set up. The rear elements lens 113 is subjected to focusing to the position wherein the best contrast is obtained by the contrast detection according to the image signal obtained in the CCD 120. Thereafter, when the shutter button is depressed, the CCD 120 creates an image signal representative of the subject, and the image signal is subjected to a suitable processing and then recorded.

Next, there will be explained the mechanism in which at the time of the collapse, the rear elements lens 113 is revolved to the saving position set up to the front elements lens side 106.

The rear elements lens holding frame 134 for holding the rear elements lens 113 is pivotally supported by the rotary shaft 206 so as to be rotatably movable with respect to the rear elements lens guide frame 133, as mentioned above. And the rear elements lens holding frame 134 is enabled by the coil spring 107 (cf. FIG. 3) in a direction in which the rear elements lens 113 is located on the optical axis of the image taking lens 110.

On the wall member 103 defining the rear of the internal space 101 of the lens barrel 100, as shown in FIG. 10, there is formed a convex portion 208, which projects into the internal space 101, in the collapse direction travelling tracks of an engagement section 134a of the rear elements lens holding frame 134.

Figure 16:
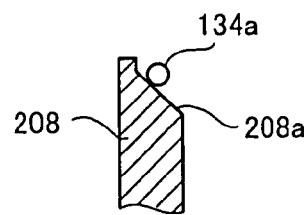
FIG. 16 is a typical illustration showing a convex portion provided on a wall member and an engagement section of a focus lens holding frame, looking from the direction different by 90 degree from the direction showing in FIG. 10.

FIG. 16 is a typical illustration showing a convex portion provided on a wall member and an engagement section of a focus lens holding frame, looking from the direction different by 90 degree from the direction showing in FIG. 10.

As shown in FIG. 16, the convex portion 208 provided on the wall member has a taper surface 208a that engages with the engagement section 134a of the rear elements lens holding frame 134. Thus, when the feed screw 131 rotates and the rear elements lens 113 moves in a direction approaching the CCD 120, the engagement section 134a of the rear elements lens holding frame 134 is in contact with the taper surface 208a of the convex portion 208 and moves along the taper surface 208a, so that the rear elements lens holding frame 134 rotatably moves around the rotary shaft 206, and the rear elements lens 113 held by the rear elements lens holding frame 134 is out of the position on the optical axis of the image taking lens 110 and revolves, and thereby moving to the saving position (cf. FIG. 13) set up to the front elements lens side 106.

When the lens barrel 100 moves from the collapsed state shown in FIG. 13 to the extension state, the convex portion 208 projecting from the wall member 103 is disengaged from the rear elements lens holding frame 134, so that the rear elements lens holding frame 134 rotatably moves by enabling of the coil spring 107 from the state shown in FIG. 11 to the state shown in FIG. 3, whereby the rear elements lens 113 revolves from the saving position set up to the front elements lens side 106 to the position on the optical axis.

Further, there will be explained a mechanism in which at the time of the collapse, the shutter unit 112 is revolved to the saving position set up to the hollow portion 104.

As mentioned above, the shutter unit holding frame 172 for holding the shutter unit 112 is pivotally supported by a rotary shaft 173 so as to be rotatably movable with respect to the shutter unit guide frame 170. And the coil spring 174 (cf. FIG. 3) enables the shutter unit 112 in such a direction that the shutter unit 112 is located on the optical axis of the image taking lens 110. A lever member 175 shown in FIG. 3 is also pivotally supported by a rotary shaft 176 so as to be rotatably movable with respect to the shutter unit guide frame 170. The shutter unit holding frame 172 is provided with a fork-shaped engagement groove 178 as shown in FIG. 3. An engagement pin 177 provided on one end of the lever member 175 comes into the engagement groove 178.

On the wall member 103 defining the rear of the internal space 101 of the lens barrel 100, as shown in FIG. 9, there is formed a convex portion 209, which projects into the internal space 101, in the collapse direction travelling tracks of an edge portion opposite side to the direction in which the engagement pin 177 of the lever member 175 is provided. At the top of the convex portion 209, there is provided a taper surface 209a. Accordingly, when the rotary cylinder 150 rotates in the collapse direction, the intermediate cylinder 160 and the shutter unit guide frame 170 engaged with the intermediate cylinder 160 also move in the collapse direction, so that an edge portion 175a of the lever member 175 is in contact with the taper surface 209a of the convex portion 209 and moves along the taper surface 209a. Thus, the lever member 175 rotatably moves from the rotary position shown in FIG. 3 to the rotary position shown in FIG. 11. Then, since the engagement pin 177 of the lever member 175 comes into the fork-shaped engagement groove 178 of the shutter unit holding frame 172, the shutter unit holding frame 172 also rotates around the rotary shaft 173, so that the shutter unit 112 is saved from the position on the optical axis shown in FIG. 3 to the saving position out of the optical axis, as shown in FIG. 11. The saving position is, as shown in FIG. 13, the hollow portion 104 (see FIG. 7) formed by the side of the CCD 120.

When the lens barrel moves from the collapsed state as shown in FIG. 13 in the extension direction, the convex portion 209 projecting from the wall member 103 as shown in FIG. 9 is disengaged from the lever member 175, so that enabling of the coil spring 174 causes the shutter unit holding frame 172 to rotate from the state shown in FIG. 11 to the state shown in FIG. 3, whereby the shutter unit 112 revolves from the saving position shown in FIG. 13 to the position on the optical axis.

According to the first embodiment, as mentioned above, at the time of the collapse, the rear elements lens 113 is saved to the front elements lens side 106, and the shutter unit 112 is saved to the hollow portion 104 by the side of the CCD 120. In case of the digital camera having the conventional collapse and extension mechanism which has no mechanism for saving an image taking lens from an optical axis wherein the image taking lens is collapsed while being disposed on the optical axis, the front elements lens side 106 and the hollow portion 104 are apt to be a dead space. To the contrary, according to the first embodiment, both the rear elements lens 113 and the shutter unit 112 are out of the optical axis and are saved to the front elements lens side 106 and the hollow portion 104, respectively. Thus, the front elements lens side 106 and the hollow portion 104 are effectively used and thereby implementing further thinness of the lens structure as compared with the conventional ones.

According to the present embodiment, at the time of the collapse, the rear elements lens 113 is saved to the front elements lens side 106, and the shutter unit 112 is saved to the hollow portion 104 by the side of the CCD 120. However, the present invention is not restricted to this scheme. It is acceptable that both the rear elements lens 113 and the shutter unit 112 are saved to the hollow portion 104 by the side of the CCD 120. Or alternatively, it is acceptable that both the rear elements lens 113 and the shutter unit 112 are saved to the front elements lens side 106. Further, according to the present invention, it is acceptable that the rear elements lens 113 is saved to the hollow portion 104 by the side of the CCD 120, and the shutter unit 112 is saved to the front elements lens side 106.

Figure 17:
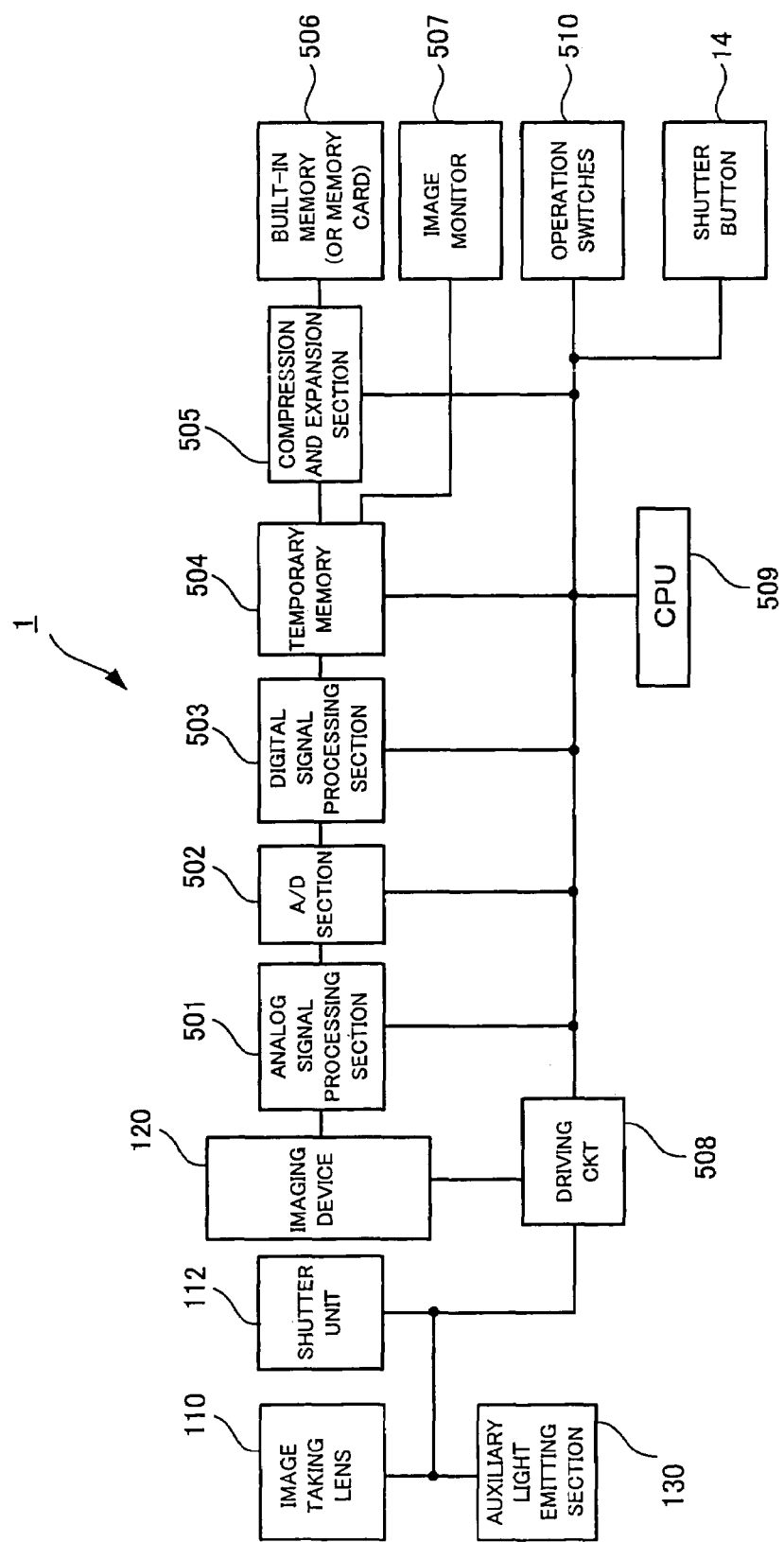
FIG. 17 is a block diagram of a circuit structure of the digital camera of the first embodiment.

FIG. 17 is a block diagram of a circuit structure of the digital camera shown in FIG. 1 to FIG. 16.

The digital camera 1 is provided with the image taking lens 110, the shutter unit 112, and the CCD imaging device 120, as mentioned above. A subject image formed on the CCD imaging device 120 via the image taking lens 110 and the shutter unit 112 is converted into an analog image signal by the CCD imaging device 120. The shutter unit 112 serves to suppress generation of smear due to light when analog signals are read from the CCD imaging device 120.

The digital camera 1 is further provided with an auxiliary light emitting section 130. The auxiliary light emitting section 130 emits an auxiliary light at the time of a low illumination. The auxiliary light emitting section 130 may emit the auxiliary light at any necessary time other than the low illumination.

The digital camera 1 is further provided with an analog signal processing section 501, an A/D section 502, a digital signal processing section 503, a temporary memory 504, a compression and expansion section 505, a built-in memory (or a memory card) 506, an image monitor 507, and a driving circuit 508. The CCD imaging device 120 is driven by a timing generated from a timing generating circuit (not illustrated) of the driving circuit 508, and outputs an analog image signal. The driving circuit 508 includes driving circuits for driving the image taking lens 110, the shutter unit 179 and the auxiliary light emitting section 130. The analog image signal outputted from the CCD imaging device 120 is subjected to an analog signal processing by the analog signal processing section 501, an A/D conversion by the A/D section 502, and a digital signal processing by the digital signal processing section 503. Data representative of the signal subjected to the digital signal processing is temporarily stored in the temporary memory 504. The data stored in the temporary memory 504 is compressed by the compression and expansion section 505 and is recorded into the built-in memory (or a memory card) 506. Incidentally, in some photographic mode, it is acceptable that the data is recorded directly into the built-in memory 506 omitting the process of the compression. The data stored in the temporary memory 504 is read to the image monitor 507 so that an image of the subject is displayed on the image monitor 507.

The digital camera 1 is further provided with a CPU 509 for controlling the camera in its entirety, operation switches 510 including a zoom operation switch, and a shutter button 14. Photography is performed when the shutter button 14 is depressed through setting to a desired photographic state including setting to a desired angle of view by operation of the operation switches 510.

Next, there will be explained a second embodiment of the present invention.

The perspective view and the schematic circuit structure of the digital camera of the second embodiment are substantially the same as the perspective view (cf. FIG. 1 and FIG. 2) and the schematic circuit structure (cf. FIG. 17) of the digital camera of the first embodiment, and thus here there will be explained only the lens barrel which is different therebetween. Also with respect to the explanation of the lens barrel, in the following figures, the same parts are denoted by the same reference numbers as those of FIG. 3 to FIG. 16 (the first embodiment), and redundant description will be omitted.

Figure 18:
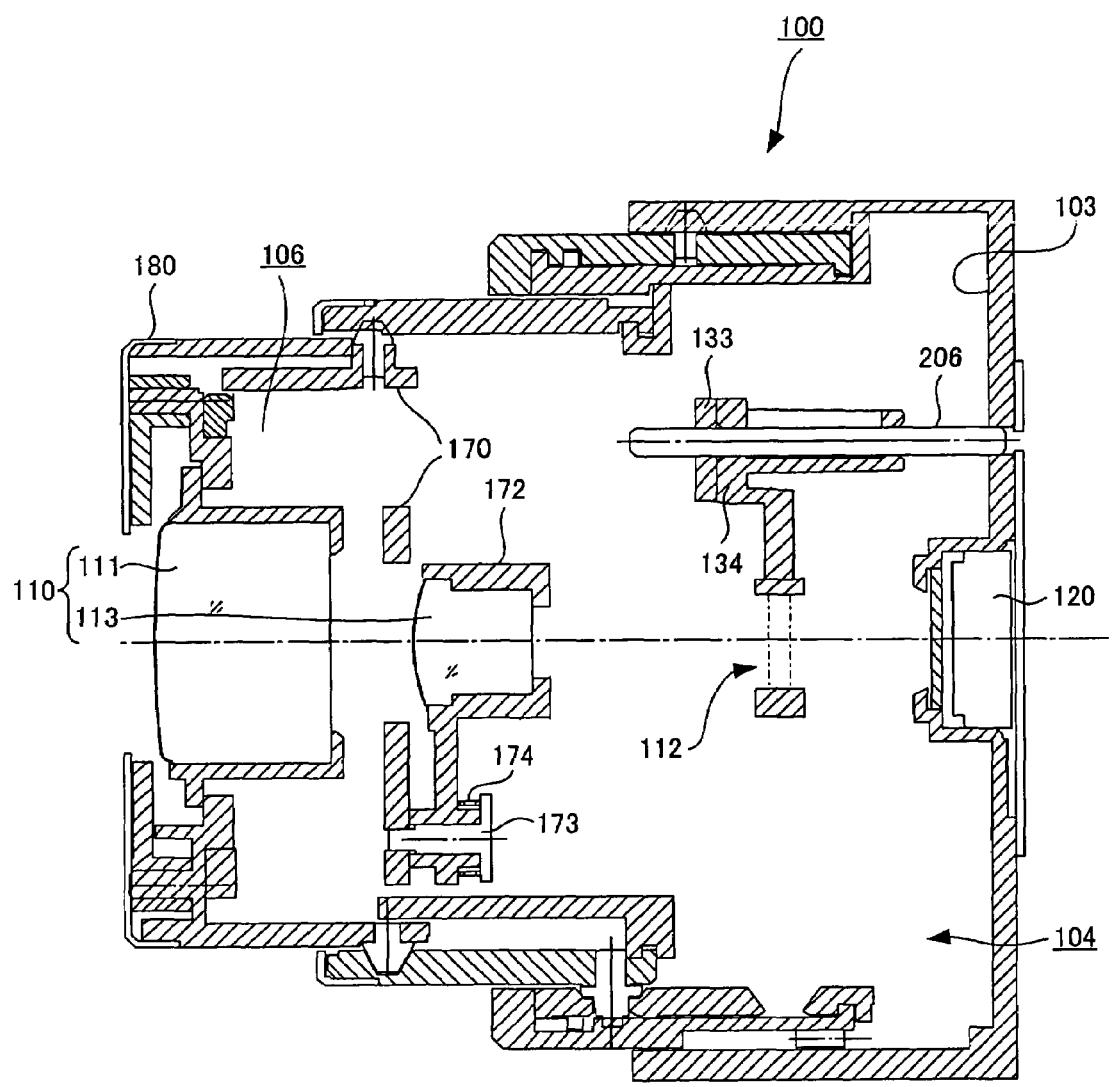
FIG. 18 is a sectional view showing a state of a tele-edge where the focal length is longest, of a digital camera of the second embodiment, taken along the optical axis.
Figure 19:
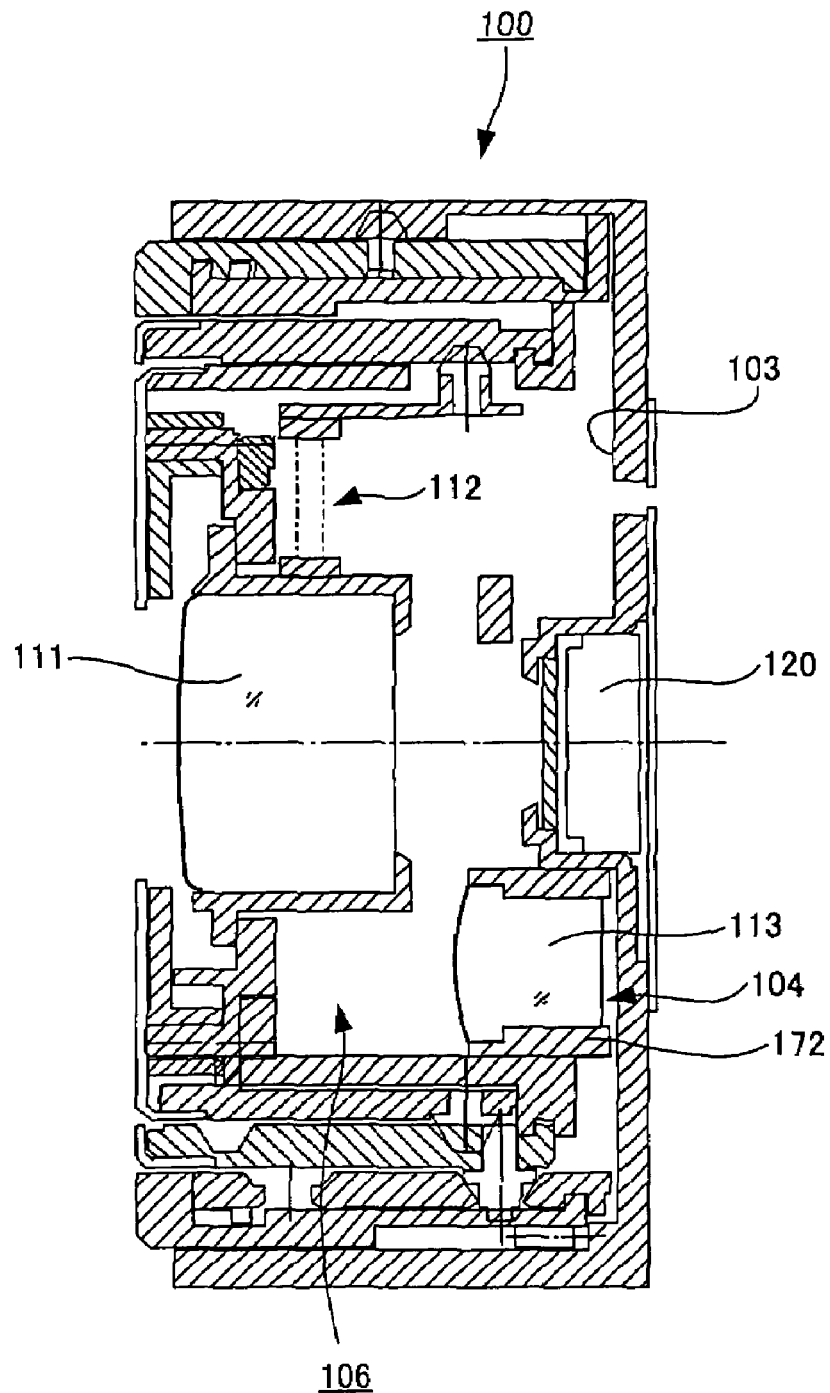
FIG. 19 is a sectional view showing a collapsed state of the digital camera of the second embodiment, taken along the optical axis.

FIG. 18 is a sectional view showing a state of a tele-edge where the focal length is longest, of a digital camera of the second embodiment, taken along the optical axis. FIG. 19 is a sectional view showing a collapsed state of the digital camera of the second embodiment, taken along the optical axis.

FIG. 18 and FIG. 19 correspond to FIG. 7 and FIG. 13, respectively, which relate to the first embodiment. Different points from the first embodiment are as follows. First, according to the first embodiment, the shutter unit is disposed between the front elements lens and the rear elements lens. To the contrary, according to the second embodiment, the shutter unit is disposed between the image taking lens, which comprises the front elements lens and the rear elements lens, and the CCD imaging device. Second, according to the first embodiment, the shutter unit is saved to the hollow portion 104 beside the CCD 120, and the rear elements lens is saved to the front elements lens side 106. To the contrary, according to the second embodiment, the shutter unit is saved to the front elements lens side 106, and the rear elements lens is saved to the hollow portion 104 beside the CCD 120. Third, according to the digital camera of the second embodiment, the focus adjustment is performed in such a manner that relative intervals among lens elements are altered in a plurality of zoom stages previously determined on a step basis (a plurality of zoom magnifications set up stepwise beforehand).

The mechanism for the save and advance involved in the collapse and extension is the same as that of the first embodiment, and thus redundant explanation will be omitted.

Also in accordance with the digital camera of the second embodiment, at the time of the collapse, the rear elements lens 113 is saved to the hollow portion 104 beside the CCD 120 and the shutter unit 112 is saved to the front elements lens side 106. Thus, this feature makes it possible to implement further thinness of the lens structure as compared with the conventional ones, since the front elements lens side 106 and the hollow portion 104 are effectively utilized.

According to the present embodiment, at the time of the collapse, the rear elements lens 113 is saved to the hollow portion 104 beside the CCD 120 and the shutter unit 112 is saved to the front elements lens side 106. However, the present invention is not restricted to the present embodiment. According to the present invention, it is acceptable that both the rear elements lens 113 and the shutter unit 112 are saved to the hollow portion 104 beside the CCD 120, or alternatively the rear elements lens 113 and the shutter unit 112 are saved to the front elements lens side 106. Further, according to the present invention, it is acceptable that the rear elements lens 113 is saved to the front elements lens side 106 and the shutter unit 112 is saved to the hollow portion 104 beside the CCD 120.

According to the above-mentioned embodiments, there are explained examples in which the rear elements lens 113 and the shutter unit 112 are saved from the photographic optical axis. However, the present invention is not restricted to those embodiments. Any one is acceptable, which is so arranged that the shutter unit is saved from the photographic optical axis, when an operating mode is changed over from the photographic state to the collapsed state, even if another elements lens is saved from the photographic optical axis. Further according to the above-mentioned embodiments, there are explained examples in which the image taking lens comprises two groups of the rear elements lens and the front elements lens. However, the present invention is not restricted to those embodiments. It is acceptable that lens elements, which are located at the most objective side on the photographic optical axis, are saved from the photographic optical axis. Furthermore, according to the above-mentioned embodiments, as the shutter unit having both the stop function and the shutter function, there is used a PLZT (a polarizing plate). However, the present invention is not restricted to those embodiments. It is acceptable that as the shutter unit there is used an electrooptical element such as a liquid crystal. And there is no need that the shutter unit is not always one using the electrooptical element, and it is acceptable to adopt a mechanical shutter for mechanically controlling an aperture caliber and a shutter speed or an iris shutter unit in which a predetermined aperture of iris is saved and advanced on the optical axis. Further, according to the present invention, it is acceptable that there is provided a unit which serves as both the aperture and the shutter. Or alternatively, it is acceptable that there is provided a unit in which the stop function and the shutter function are separated from one another. In this respect, any one is acceptable, which is so arranged that at least one of the shutter unit and the stop unit is saved from the photographic optical axis, when an operating mode is changed over from the photographic state to the collapsed state.

As mentioned above, according to the present invention, it is possible to implement further thinness of the lens structure at the time of the collapse as compared with the conventional ones.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A camera in which subject light is formed on a solid state imaging device so that an image signal is generated, the camera having a lens system comprising:
    a lens barrel incorporating therein an image taking lens, the lens barrel being variable in a barrel length between a collapsed state in which the barrel length is relatively short and a photographic state in which the barrel length is relatively long,
    wherein the lens barrel comprises:
    a light quantity control member that controls quantity of photographic light passing through the image taking lens;
    a rib provided with a fixed projection having a tapered surface;
    a first lever rotatable about a first axis when moving along the tapered surface by contraction and extension of the lens system, the first lever being adapted to press a second lever connected to the light quantity control member and rotatable about a second axis when the lens system is contracted; and
    an elastic member that keeps pressing the light quantity control member capable of rotating, towards the photographic optical axis,
    wherein the light quantity control member is positioned on the photographic optical axis when the lens system is extended as a pressing force of the lever is removed, while the light quantity control member is saved from the photographic optical axis when the lens system is contacted as the pressing force of the lever becomes larger than a pressing force of the elastic member.

2. The camera according to claim 1, wherein the image taking lens consists of a plurality of lens elements, and
    wherein the lens system further comprises a lens saving and advancing mechanism that provides such a control that when the lens barrel changes over from the photographic state to the collapsed state, any one of the plurality of lens elements is saved from the photographic optical axis independently of the light quantity control member, and when the lens barrel changes over from the collapsed state to the photographic state, any one of the plurality of lens elements is advanced to the photographic optical axis.

3. The digital camera according to claim 1, wherein the image taking lens is composed of a front elements lens and a rear elements lens, and
    when the lens barrel changes to the collapsed state, the rear elements lens is saved to a hollow portion beside the solid state imaging device and the light quantity control member is saved to a position beside the front elements lens.

4. The digital camera according to claim 1, wherein the image taking lens is composed of a front elements lens and a rear elements lens, and
    when the lens barrel changes to the collapse state, the rear elements lens and the light quantity control member are saved to a hollow portion beside the solid state imaging device.

5. The digital camera according to claim 1, wherein the image taking lens is composed of a front elements lens and a rear elements lens, and
    when the lens barrel changes to the collapse state, the rear elements lens and the light quantity control member are saved to a portion beside the front elements lens.

6. The digital camera according to claim 1, wherein the image taking lens is composed of a front elements lens and a rear elements lens, and
    when the lens barrel changes to the collapse state, the rear elements lens is saved to a portion beside the front elements lens and the light quantity control member is saved to a hollow portion beside the solid state imaging device.

* * * * *